US011596915B2

United States Patent
Morrow et al.

(10) Patent No.: US 11,596,915 B2
(45) Date of Patent: Mar. 7, 2023

(54) COMPUTERIZED SYSTEMS AND METHODS FOR TEMPERATURE PROFILE CONTROL IN A REACTOR WITH A SERIES OF FIXED BEDS

(71) Applicant: AVEVA SOFTWARE, LLC, Lake Forest, CA (US)

(72) Inventors: Alan Bee Morrow, Cumberland, RI (US); Paul Kesseler, Katy, TX (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 189 days.

(21) Appl. No.: 17/186,811

(22) Filed: Feb. 26, 2021

(65) Prior Publication Data
US 2021/0268463 A1    Sep. 2, 2021

Related U.S. Application Data

(60) Provisional application No. 62/982,792, filed on Feb. 28, 2020.

(51) Int. Cl.
*B01J 8/04*    (2006.01)
*B01J 8/00*    (2006.01)
*C10G 47/36*   (2006.01)

(52) U.S. Cl.
CPC ............. *B01J 8/0496* (2013.01); *B01J 8/001* (2013.01); *C10G 47/36* (2013.01); *B01J 2208/00061* (2013.01); *B01J 2208/00725* (2013.01)

(58) Field of Classification Search
CPC ....................... B01J 8/0496; B01J 8/001; B01J 2208/00061; B01J 2208/00725; B01J 2208/00176; B01J 8/0442; C10G 47/36
See application file for complete search history.

(56) References Cited

U.S. PATENT DOCUMENTS

| 3,972,957 A | 8/1976 | Zabransky |
| 4,236,219 A | 11/1980 | Killebrew, Jr. et al. |
| 4,272,823 A | 6/1981 | Pool |

FOREIGN PATENT DOCUMENTS

| JP | 2019141827 A | * | 8/2019 |
| JP | 2019141827 A | | 8/2019 |

(Continued)

OTHER PUBLICATIONS

Korean Intellectual Property Office, International Search Report and Written Opinion for International Patent Application No. PCT/US2021/019924, dated Jun. 17, 2021, 9 pages, Republic of Korea.

*Primary Examiner* — Randy Boyer
*Assistant Examiner* — Juan C Valencia
(74) *Attorney, Agent, or Firm* — Greenberg Traurig, LLP

(57) ABSTRACT

Disclosed are systems, servers and methods for improving temperature profile control in a reactor with at least three fixed beds, exothermic reactions and interstage cooling. A model of the temperature differential across the first bed is developed and its error is used to infer unmeasured feed composition disturbances, which are used in the control of the downstream fixed beds for faster response to unmeasured feed composition changes and improved control of the temperature profile throughout the reactor. The first bed model error is then used as an input into an overall model that predicts reactor temperature profiles, which provides advanced notice of reactions in downstream beds, and enables efficient adjustment and compensation to a feed composition change. A Model Predictive Control (MPC) algorithm is applied to adjust the bed intercooling and first bed feed temperature so that the reactor temperature profile can be more precisely controlled.

20 Claims, 7 Drawing Sheets

(56) References Cited

FOREIGN PATENT DOCUMENTS

WO  2009082930 A1  7/2009
WO  WO-2009082930 A1 *  7/2009  .......... B01J 35/0006

* cited by examiner

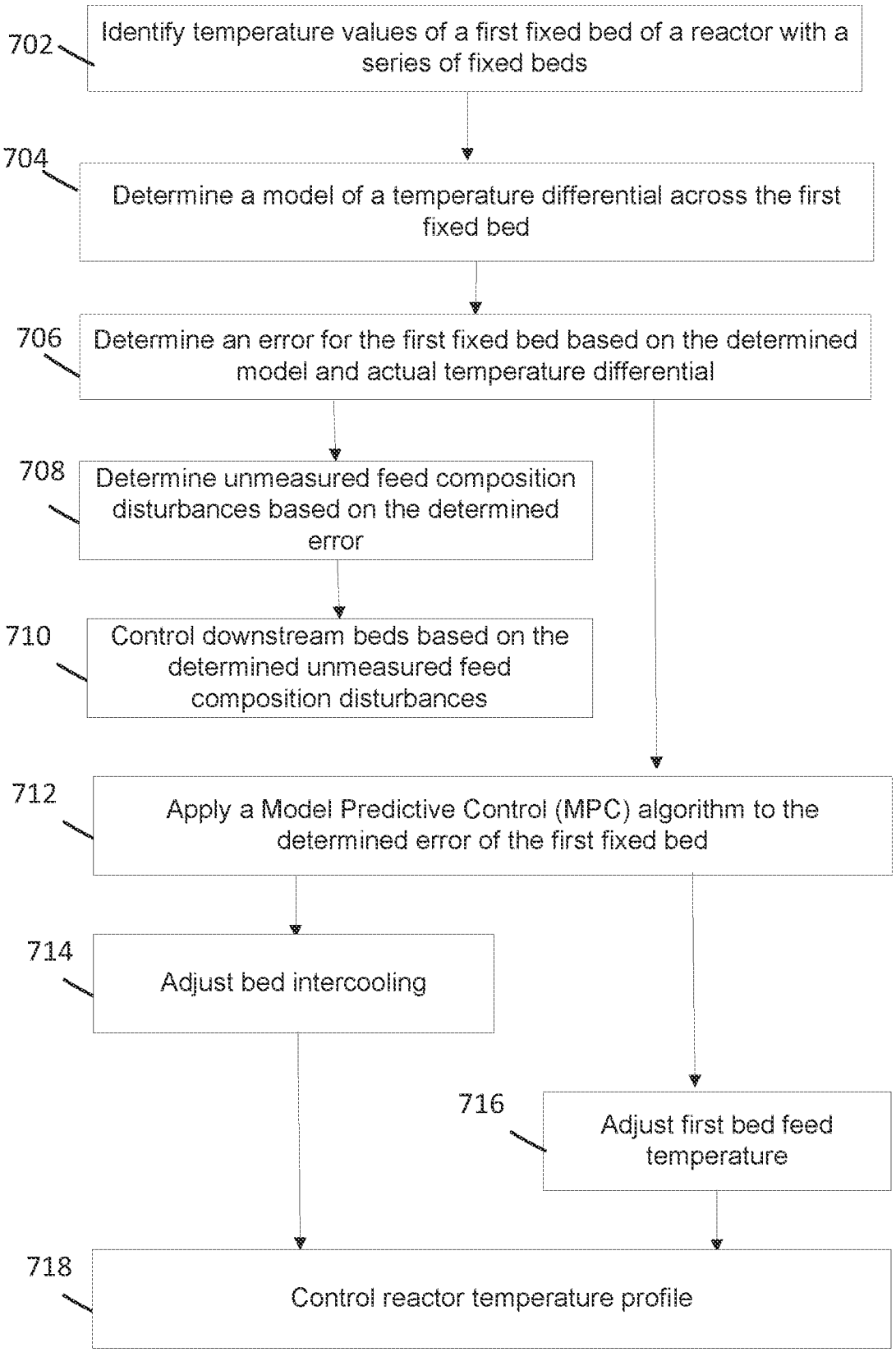

COMPUTERIZED SYSTEMS AND METHODS FOR TEMPERATURE PROFILE CONTROL IN A REACTOR WITH A SERIES OF FIXED BEDS

CROSS-REFERENCE TO RELATED APPLICATIONS

This application claims the benefit of priority from U.S. Provisional Application No. 62/982,792, filed Feb. 28, 2020, entitled "SYSTEM, SERVER AND METHOD FOR REACTOR TEMPERATURE PROFILE CONTROL," which is incorporated herein by reference in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

Control of the temperature profile of a series of fixed bed reactors can be a common problem in the chemical and hydrocarbon industries. There are several technologies that can be used to address this problem, for example, 1) proportional integral derivate (PID) loop control residing in a Distributed Control System ("DCS") or Programable Logic Controller ("PLC"); 2) PID loop control with feed forward inputs residing in a DCS or PLC; 3) expert systems; 4) fuzzy logic; and/or 5) Model Predictive Control ("MPC").

SUMMARY

Currently, however, none of these technologies use any methods of inferring feed composition changes. The disclosed systems, servers and methods address these shortcomings, among others, by providing an improved fixed bed and/or other reactor temperature profile control that operates under a wide range of conditions.

In some embodiments, the disclosed systems, servers and methods provide a fixed bed reactor temperature profile control that uses interstage model error inputs. Some embodiments provide a system, server and method to improve temperature profile control in a reactor with at least three fixed beds, exothermic reactions and interstage cooling. In some embodiments, the system, server and method for reactor temperature profile control can improve temperature profile control for a reactor and will result in more efficient reactor operation. Some embodiments therefore improve conversion, product yield, and product quality which has a positive impact on profitability of the unit.

In some embodiments, the system, server and method for reactor temperature profile control can be a novel method of applying an external model to calculate model error and infer feed composition changes. In some embodiments, this error can input into a MPC algorithm to improve the overall temperature profile control of all beds in the reactor.

In some embodiments, use of the first bed effluent temperature model error can indicate feed composition disturbances. In some embodiments, integration of the temperature model error into an overall model can better predict and control fixed bed temperature profiles. In some embodiments, exothermic fixed bed reactor temperature profiles can be controlled by adjusting the temperature of feed entering the first bed and by adjusting the interstage cooling (i.e, quenching) to cool the effluent from each bed. In some embodiments, these temperature profiles can be difficult to control due to changes in reactor feed flow and unmeasured changes in feed compositions. In some embodiments, a change in feed composition can affect reactions and heat evolved in all the beds and the temperature profile of the reactor.

According to some embodiments, a computing device is disclosed which comprises: one or more processors; and a non-transitory computer-readable memory having stored therein computer-executable instructions, that when executed by the one or more processors, cause the one or more processors to perform operations for controlling a temperature profile of a reactor.

In some embodiments, the device comprises operations that, inter alia, identify a set of values of a first fixed bed of a reactor with a series of fixed beds; determine, based on the identified values, a predicted temperature differential for the first fixed bed; determine an actual temperature differential for the first fixed bed; determine, based on the predicted temperature differential and the actual temperature differential, a model error for the first fixed bed; apply a model predictive control (MPC) algorithm to the determined model error; and automatically control (without user input, via engine 400, as discussed below), based on the application of the MPC, a temperature profile of the reactor, the temperature profile corresponding to each of the series of beds in the reactor, the temperature profile providing functionality for temperature control of reactions in each of the series of beds to compensate for feed composition changes.

In some embodiments, the processor is further configured to: adjust intercooling between each of the series of beds based on the application of the MPC, wherein the control is based on the intercooling adjustment.

In some embodiments, the processor is further configured to: adjust a feed temperature for the first fixed bed based on the application of the MPC, wherein the control is based on the feed temperature adjustment.

In some embodiments, the processor is further configured to: determine, based on the model error, a change in unmeasured feed composition. In some embodiments, the processor is further configured to: control downstream beds based at least in part on the determined change in unmeasured feed composition, wherein the downstream beds comprise beds within the series of beds of the reactor other than the first fixed bed. In some embodiments, the control of the downstream beds comprises responding to unmeasured feed composition changes in each of the downstream beds.

In some embodiments, the values correspond to temperature values across and within the first fixed bed. In some embodiments, the temperature values correspond to an inlet, outlet and interior of the first fixed bed. In some embodiments, the values correspond to a feed inlet temperature, feed flow and components of the feed flow.

In some embodiments, the first fixed bed is the bed of the reactor that receives a total feed stream as an initial input.

According to some embodiments, a computer-implemented method is disclosed for improving temperature profile control in a reactor with at least three fixed beds, exothermic reactions and interstage cooling, as discussed herein.

Some embodiments provide a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., a server(s)) cause at least one processor to perform a method for improving temperature profile control in a reactor with at least three fixed beds, exothermic reactions and interstage cooling, as discussed herein.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with some embodiments, program code (or program logic) executed by a processor(s) of a computing device to implement functionality in accordance with one or more such embodiments is embodied in, by and/or on a non-transitory computer-readable medium.

DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 7 is a flowchart detailing a non-limiting example embodiment according to some embodiments of the present disclosure.

DETAILED DESCRIPTION

Figure 1:
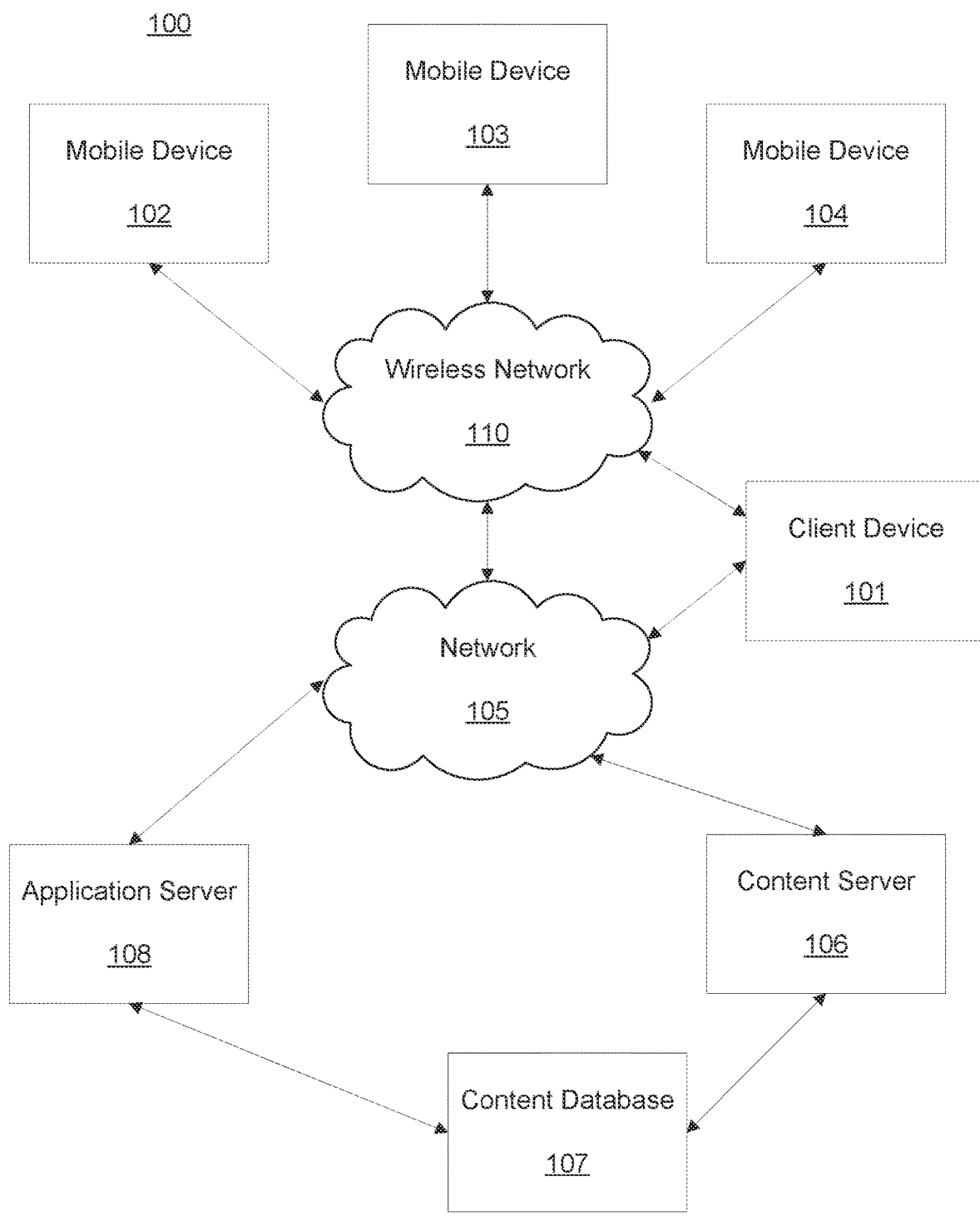
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments will now be described in greater detail with reference to the figures. In general, with reference to FIG. 1, a system 100 in accordance with some embodiments of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106 and application (or "App") server 108.

Some embodiments of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In some embodiments, such communications may include sending and/or receiving messages, creating and uploading documents, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

In some embodiments, wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

In some embodiments, network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

In some embodiments, the content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. In some embodiments, content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example the email services and email platform, can be provided via the message server 120.

In some embodiments, users are able to access services provided by servers 106 and 108. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, application server 108, for example, can store various types of applications and application related information including application data and user profile information (e.g., identifying, generated and/or observed information associated with a user).

In some embodiments, content server 106 and app server 108 can store various types of data related to the content and services each provide, observe, identify, determine, generate, modify, retrieve and/or collect. Such data can be stored in an associated content database 107, as discussed in more detail below.

In some embodiments, server 106 and/or 108 can be embodied as a cloud server or configured for hosting cloud services, as discussed herein.

In some embodiments, the network 105 is also coupled with/connected to a Trusted Search Server (TSS) which can be utilized to render content in accordance with the embodiments discussed herein. Embodiments exist where the TSS functionality can be embodied within servers 106 and 108.

Moreover, although FIG. 1 illustrates servers 106 and 108 as single computing devices, respectively, the disclosure is not so limited. For example, one or more functions of servers 106 and 108 may be distributed across one or more distinct computing devices. Moreover, in some embodiments, servers 106 and 108 may be integrated into a single computing device, without departing from the scope of the present disclosure.

Additionally, while the illustrated embodiment in FIG. 1 depicts only servers 106 and 108, it should not be construed as limiting, as any type and number of servers can be included therein.

Figure 2:
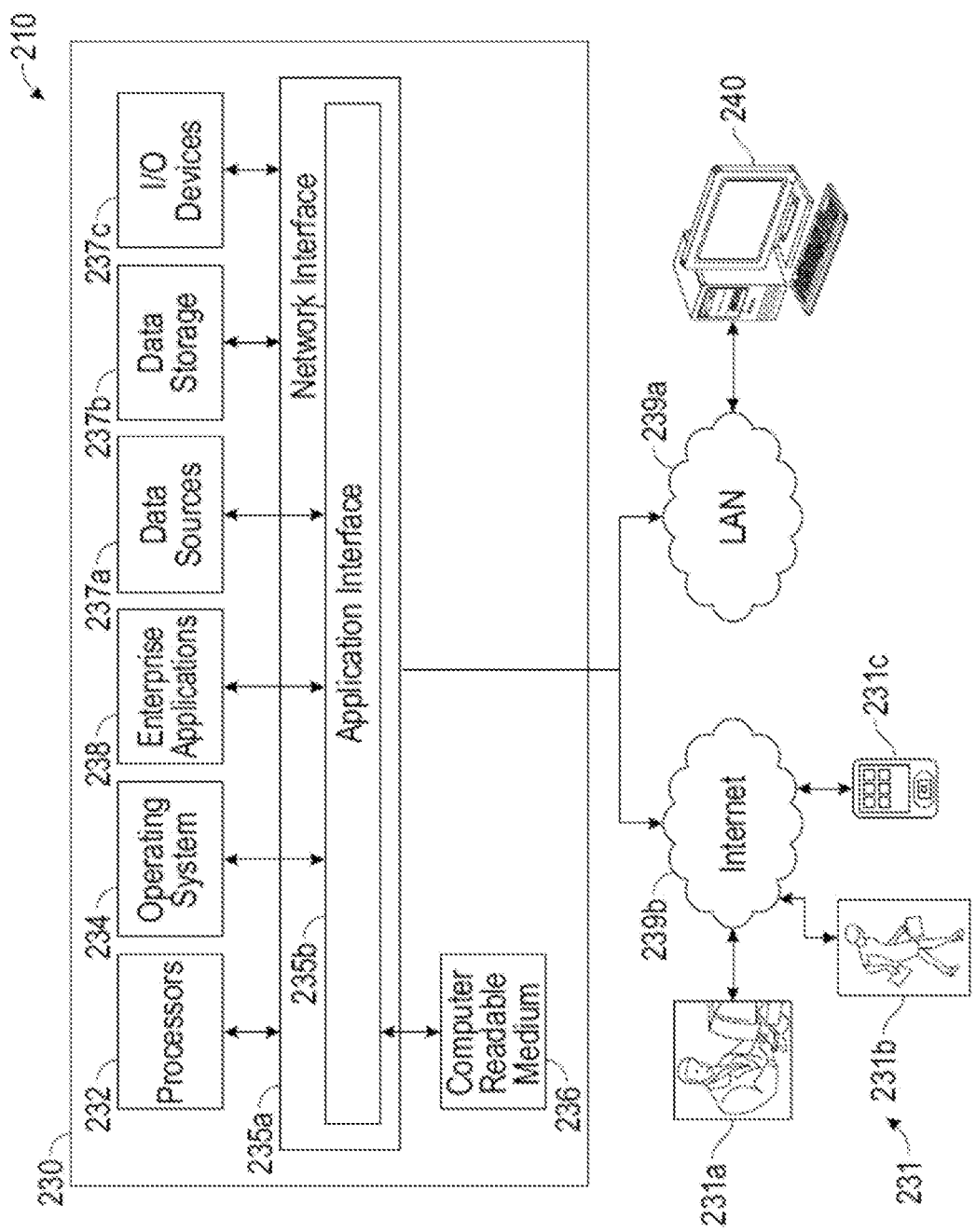
FIG. 2 is a schematic diagram illustrating an example of a network within which the systems and methods disclosed herein could be implemented according to some embodiments of the present disclosure.

Turning to FIG. 2, computer system 210 is depicted and is a non-limiting example embodiment of system 100 discussed above in relation to FIG. 1.

FIG. 2 illustrates a computer system 210 enabling or operating an embodiment of system 100 of FIG. 1, as discussed below. In some embodiments, computer system 210 can include and/or operate and/or process computer-executable code of one or more of the above-mentioned program logic, software modules, and/or systems. Further, in some embodiments, the computer system 210 can operate and/or display information within one or more graphical user interfaces. In some embodiments, the computer system 210 can comprise a cloud server and/or can be coupled to one or more cloud-based server systems.

In some embodiments, the system 210 can comprise at least one computing device 230 including at least one processor 232. In some embodiments, the at least one processor 232 can include a processor residing in, or coupled to, one or more server platforms. In some embodiments, the system 210 can include a network interface 235a and an application interface 235b coupled to the least one processor 232 capable of processing at least one operating system 234. Further, in some embodiments, the interfaces 235a, 235b coupled to at least one processor 232 can be configured to process one or more of the software modules 238 (e.g., such as enterprise applications). In some embodiments, the software modules 238 can include server-based software, and can operate to host at least one user account and/or at least one client account, and operating to transfer data between one or more of these accounts using the at least one processor 232.

With the above embodiments in mind, it should be understood that some embodiments can employ various computer-implemented operations involving data stored in computer systems. Moreover, the above-described databases and models described throughout can store analytical models and other data on computer-readable storage media within the system 210 and on computer-readable storage media coupled to the system 210. In addition, the above-described applications of the system can be stored on non-transitory computer-readable storage media within the system 210 and on computer-readable storage media coupled to the system 210.

In some embodiments, the system 210 can comprise at least one non-transitory computer readable medium 236 coupled to at least one data source 237a, and/or at least one data storage device 237b, and/or at least one input/output device 237c. In some embodiments, the disclosed systems and methods can be embodied as computer readable code on a computer readable medium 236. In some embodiments, the computer readable medium 236 can be any data storage device that can store data, which can thereafter be read by a computer system (such as the system 210). In some embodiments, the computer readable medium 236 can be any physical or material medium that can be used to tangibly store the desired information or data or instructions and which can be accessed by a computer or processor 232. In some embodiments, at least one of the software modules 238 can be configured within the system to output data to at least one user 231 via at least one graphical user interface rendered on at least one digital display.

In some embodiments, the non-transitory computer readable medium 236 can be distributed over a conventional computer network via the network interface 235a where the system embodied by the computer readable code can be stored and executed in a distributed fashion. For example, in some embodiments, one or more components of the system 210 can be coupled to send and/or receive data through a local area network ("LAN") 239a and/or an internet coupled network 239b (e.g., such as a wireless internet). In some further embodiments, the networks 239a, 239b can include wide area networks ("WAN"), direct connections (e.g., through a universal serial bus port), or other forms of computer-readable media 236, or any combination thereof.

In some embodiments, components of the networks 239a, 239b can include any number of user devices such as personal computers including for example desktop computers, and/or laptop computers, or any fixed, generally non-mobile internet appliances coupled through the LAN 239a. For example, some embodiments include personal computers 240a coupled through the LAN 239a that can be configured for any type of user including an administrator. Other embodiments can include personal computers coupled through network 239b. In some further embodiments, one or more components of the system 210 can be coupled to send or receive data through an internet network (e.g., such as network 239b). For example, some embodiments include at least one user 231 coupled wirelessly and accessing one or more software modules of the system including at least one enterprise application 238 via an input and output ("I/O") device 237c. In some other embodiments, the system 210 can enable at least one user 231 to be coupled to access enterprise applications 238 via an I/O device 237c through LAN 239a. In some embodiments, the user 231 can comprise a user 231a coupled to the system 210 using a desktop computer, and/or laptop computers, or any fixed, generally non-mobile internet appliances coupled through the internet 239b. In some embodiments, the user 231 can comprise a mobile user 231b coupled to the system 210. In some embodiments, the user 231b can use any mobile computing device 231c to wirelessly coupled to the system 210, including, but not limited to, personal digital assistants, and/or cellular phones, mobile phones, or smart phones, and/or pagers, and/or digital tablets, and/or fixed or mobile internet appliances.

Figure 3:
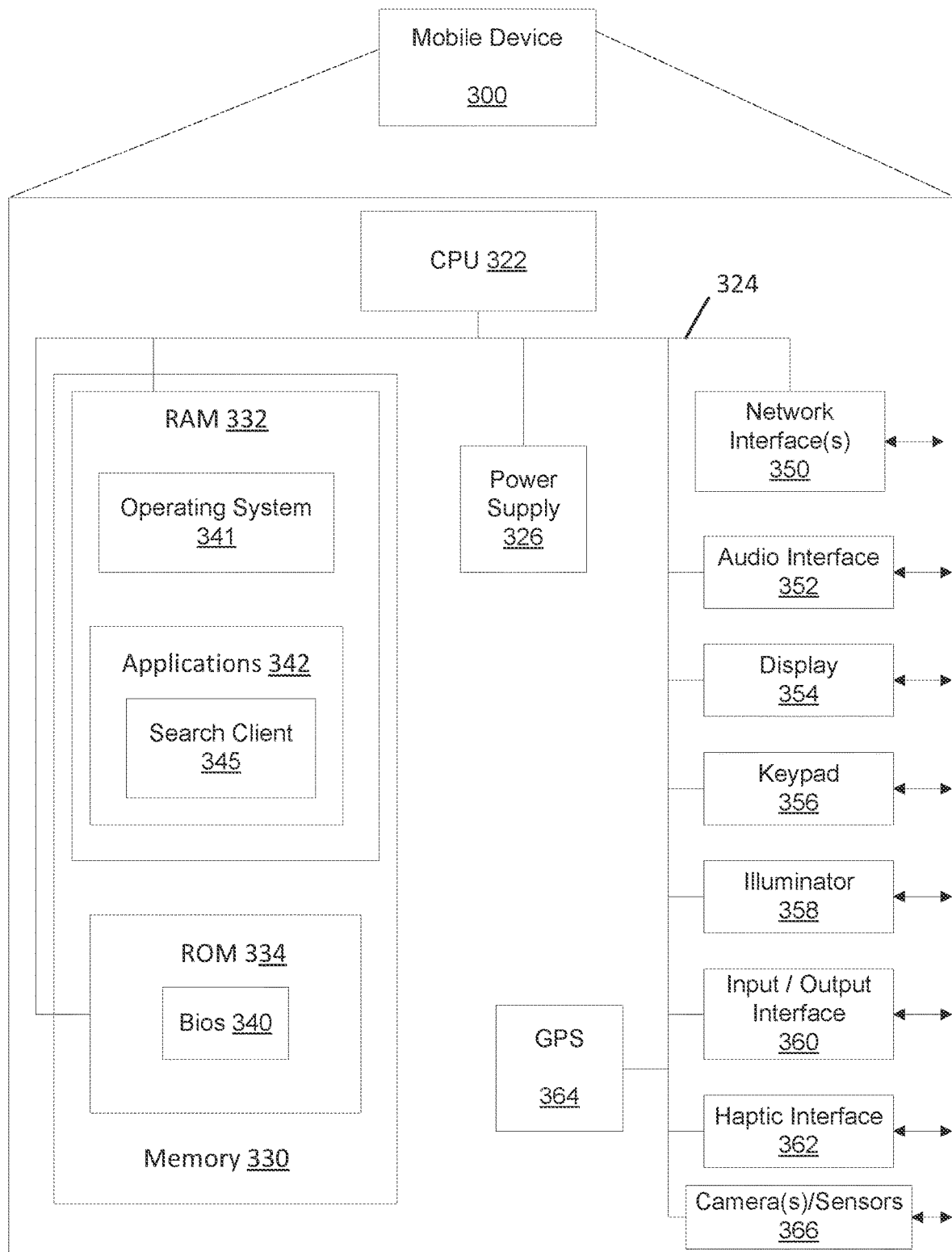
FIG. 3 depicts is a schematic diagram illustrating an example of client device according to some embodiments of the present disclosure.

FIG. 3 is a schematic diagram illustrating a client device showing an example embodiment of a client device that may be used within the present disclosure. Client device 300 may include many more or fewer components than those shown in FIG. 3. However, the components shown are sufficient to disclose an illustrative embodiment for implementing the present disclosure. Client device 300 may represent, for example, client devices discussed above in relation to FIGS. 1-2.

As shown in FIG. 3, in some embodiments, client device 300 includes a processing unit (CPU) 322 in communication with a mass memory 330 via a bus 324. In some embodiments, client device 300 also includes a power supply 326, one or more network interfaces 350, an audio interface 352, a display 354, a keypad 356, an illuminator 358, an input/output interface 360, a haptic interface 362, an optional global positioning systems (GPS) receiver 364 and a camera(s) or other optical, thermal or electromagnetic sensors 366. Device 300 can include one camera/sensor 366, or a plurality of cameras/sensors 366, as understood by those of skill in the art. Power supply 326 provides power to the client device 300.

Client device 300 may optionally communicate with a conventional base station (not shown), or directly with another computing device. Network interface 350 is sometimes known as a transceiver, transceiving device, or network interface card (NIC).

In some embodiments, audio interface 352 is arranged to produce and receive audio signals such as the sound of a human voice. Display 354 may be a liquid crystal display (LCD), gas plasma, light emitting diode (LED), or any other type of display used with a computing device. Display 354 may also include a touch sensitive screen arranged to receive input from an object such as a stylus or a digit from a human hand.

Keypad 356 may comprise any input device arranged to receive input from a user. Illuminator 358 may provide a status indication and/or provide light.

In some embodiments, client device 300 also comprises input/output interface 360 for communicating with external. Input/output interface 360 can utilize one or more communication technologies, such as USB, infrared, Bluetooth™, or the like. In some embodiments, haptic interface 362 is arranged to provide tactile feedback to a user of the client device.

Optional GPS transceiver 364 can determine the physical coordinates of client device 300 on the surface of the Earth, which typically outputs a location as latitude and longitude values. GPS transceiver 364 can also employ other geo-positioning mechanisms, including, but not limited to, triangulation, assisted GPS (AGPS), E-OTD, CI, SAI, ETA, BSS or the like, to further determine the physical location of Client device 300 on the surface of the Earth. In some embodiments, however, the client device 300 may through other components, provide other information that may be employed to determine a physical location of the device, including for example, a MAC address, Internet Protocol (IP) address, or the like.

In some embodiments, mass memory 330 includes a RAM 332, a ROM 334, and other storage means. Mass memory 330 illustrates another example of computer storage media for storage of information such as computer readable instructions, data structures, program modules or other data. Mass memory 330 stores a basic input/output system ("BIOS") 340 for controlling low-level operation of client device 300. The mass memory also stores an operating system 341 for controlling the operation of client device 300.

In some embodiments, memory 330 further includes one or more data stores, which can be utilized by client device 300 to store, among other things, applications 342 and/or other information or data. For example, data stores may be employed to store information that describes various capabilities of client device 300. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within client device 300.

In some embodiments, applications 342 may include computer executable instructions which, when executed by client device 300, transmit, receive, and/or otherwise process audio, video, images, and enable telecommunication with a server and/or another user of another client device. In some embodiments, applications 342 may further include search client 345 that is configured to send, to receive, and/or to otherwise process a search query and/or search result.

Having described the components of the general architecture employed within some embodiments, the components' general operation with respect to some embodiments will now be described below.

Figure 4:
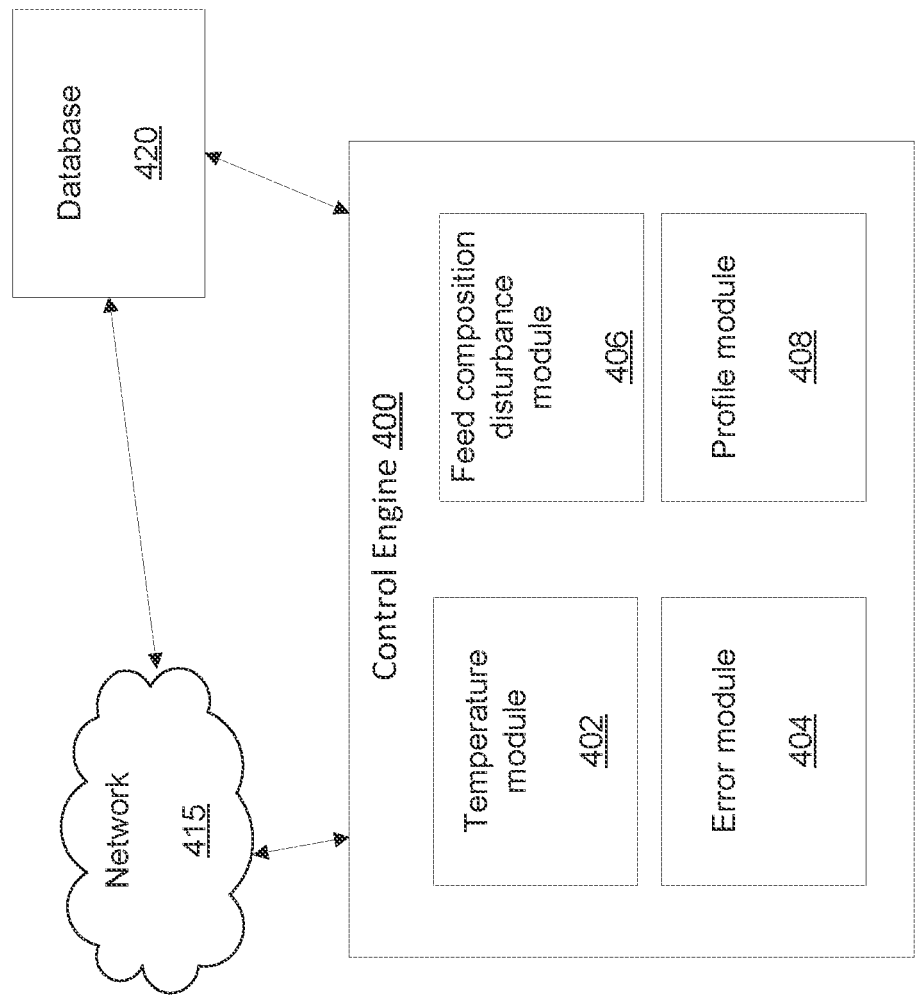
FIG. 4 is a block diagram illustrating components of an exemplary system according to some embodiments of the present disclosure.

FIG. 4 is a block diagram illustrating the components of some embodiments. FIG. 4 includes control engine 400, network 415 and database 420. The user interface (UI) engine 400 can be a special purpose machine or processor and could be hosted by a cloud server (e.g., cloud web services server(s)), application server, content server, web server, search server, content provider, third party server, user's computing device, and the like, or any combination thereof.

According to some embodiments, control engine 400 can be embodied as a stand-alone application that executes on a server and/or user device (e.g., on a cloud server and/or on-prem on a user device or local storage). In some embodiments, the control engine 400 can function as an application installed on a device; and, in some embodiments, such application can be a web-based application accessed by a device over a network.

The database 420 can be any type of database or memory and can be associated with a content server on a network (e.g., cloud server, content server, a search server or application server) or a user's device (e.g., client devices discussed above in FIGS. 1-3). Database 420 comprises a dataset of data and metadata associated with local and/or network information related to users, services, applications, content and the like. Such information can be stored and indexed in the database 420 independently and/or as a linked or associated dataset. As discussed above, it should be understood that the data (and metadata) in the database 420 can be any type of information and type, whether known or to be known, without departing from the scope of the present disclosure.

According to some embodiments, database 420 can store data and metadata associated with users, operations, tasks, assets, files, projects, versions, synchronization events, schedules, images, videos, text, messages, products, items and services from an assortment of media and/or service providers and/or platforms, and the like. It should be understood that the data (and metadata) in the database 420 can be any type of information related to a user, asset, location, job, operation, content, a device, an application, a service provider, a content provider, whether known or to be known, without departing from the scope of the present disclosure.

As discussed above, with reference to FIGS. 1-2, the network 415 can be any type of network such as, but not limited to, a wireless network, a local area network (LAN), wide area network (WAN), the Internet, or a combination thereof. The network 415 facilitates connectivity of the control engine 400, and the database of stored resources 420. Indeed, as illustrated in FIG. 4, the control engine 400 and database 420 can be directly connected by any known or to be known method of connecting and/or enabling communication between such devices and resources.

The principal processor, server, or combination of devices that comprises hardware programmed in accordance with the special purpose functions herein is referred to for convenience as control engine 400, and includes temperature module 402, error module 404, feed composition disturbance module 406 and profile module 408. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 5:
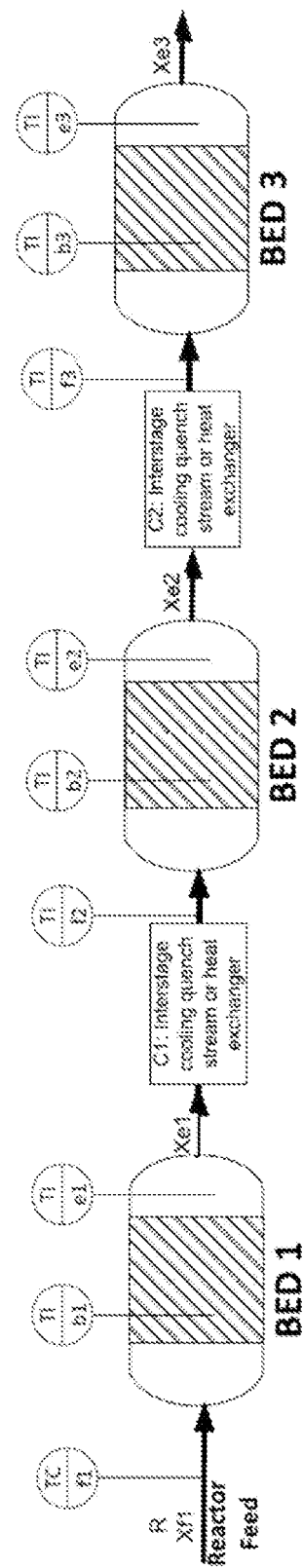
FIG. 5 illustrates a non-limiting embodiment of a fixed bed reactor with interstage cooling according to some embodiments of the present disclosure.
Figure 6:
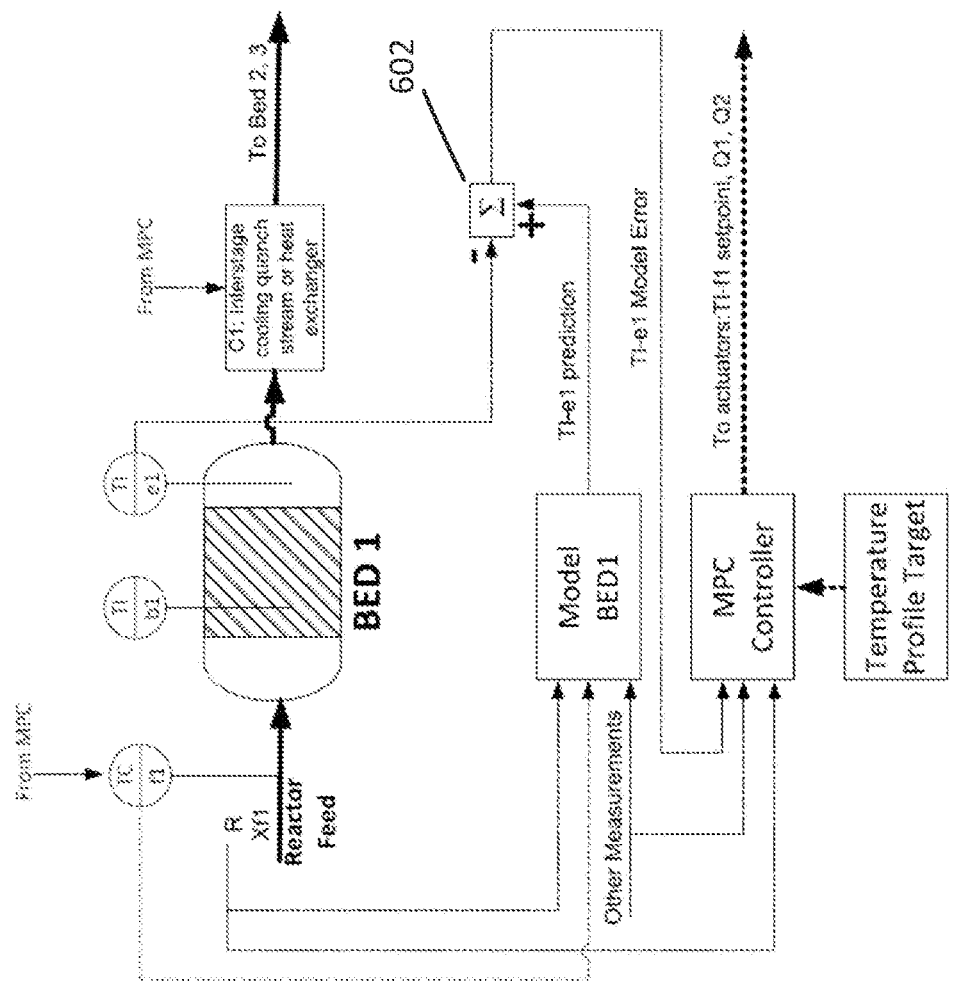
FIG. 6 illustrates a model and control structure according to some embodiments of the present disclosure.

Turning now to FIGS. 5-7, embodiments are discussed that disclose example embodiments for controlling a temperature profile for a reactor with a series of fixed beds. FIG. 5 illustrates a non-limiting embodiment of a fixed bed reactor 500 with interstage cooling according to some embodiments of the present disclosure. As illustrated, the reactor 500 in FIG. 5 includes three fixed beds: bed 1, bed 2 and bed 3; however, as discussed herein, the number, order and/or configuration of the beds should not be construed as limiting, as any number, order and configuration can implement the disclosed systems and methods without departing from the scope of the instant disclosure.

As illustrated in FIG. 5, in some embodiments. R can be the mass flow feed to the reactor 500. In some embodiments, TC-f1, TC-f2, and TI-f3 illustrate the feed temperature to beds 1, 2, and 3. In some embodiments, TI-e1, TI-e2, and TI-e3 illustrate the bed effluent (outlet) temperatures in beds 1, 2, and 3. In some embodiments, C1 and C2 illustrate the interstage cooling quench stream or heat exchanger.

In some embodiments, C1 illustrates the heat removed by interstage cooling between bed 1 and bed 2 via a quench stream or heat exchanger, or the like. In some embodiments, C2 illustrates the heat removed by interstage cooling between bed 2 and bed 3 via a quench stream or heat exchanger, or the like. In some embodiments, R can represent the total feed stream to bed 1. In some embodiments, R can be the sum of several feed streams that are measured individually.

In some embodiments, X can define the steam composition. In some embodiments, X can be a vector of component mass or mol fractions. In some embodiments, three reactor beds can be shown and can be labeled consistently with the first bed. In some embodiments, there can be a minimum of three beds. Additionally, as discussed above, some embodiments can comprise fewer than or more than three beds.

In some embodiments, the method of interstage cooling can be dependent upon the reactor design (also referred to as the reactor configuration, used interchangeably). For example, hydrocracking units in the hydrocarbon industry can use a hydrogen stream to cool (quench) the bed effluent. One of skill in the art would readily understand that other designs can use a heat exchanger or other methods for cooling.

FIG. 5 is simplified to show inlet, outlet and interior bed temperatures as single measurements. However, many embodiments use multiple measurements to calculate bed feed temperatures, interior bed temperatures and effluent temperatures, and one of skill in the art would be able to understand and account for such measurements and calculations.

In some embodiments, a mathematical model can be used to dynamically predict bed 1 effluent temperature (TI-e1). In some embodiments, TI-e1 can be based on measured inputs, such as feed inlet temperature (TC-f1), feed flow R, or individual components of R. In some embodiments, additional measured inputs can be used.

In some embodiments, model error can be calculated by subtracting the measured value of TI-e1 from the predicted value of TI-e1. In some embodiments, the mathematical model used to predict the bed 1 effluent temperature can be any type of algorithm, for example, common algorithms can be Finite Impulse Response ("FIR"), Auto-Regressive with eXogeneous inputs ("ARx"), and neural nets, and the like, or some combination thereof.

In some embodiments, the TI-e1 model error can relate to the change in unmeasured feed composition Xf1. For example, if an error is trending positive it can indicate that the feed composition Xf1 is changing so that there are more exothermic reactions in bed 1 than predicted. In some embodiments, the change in reactor conditions can lead to a change in the bed 1 effluent composition (Xe1) and can affect bed 2 conditions and temperatures. In some embodiments, after the fluid passes through bed 2 it can cascade to disturb bed 3 and any other beds in the series.

In some embodiments, bed 2, bed 3, and any additional downstream bed temperatures can be modeled as a function TI-e1 model error, and other inputs such as R and TC-f1. In some embodiments, a further model can be developed using these inputs to predict all bed temperatures downstream of TI-e1. In some embodiments, the prediction of all bed temperatures downstream of bed 1 can be improved.

In some embodiments, an MPC algorithm can adjust actuators to more precisely control the desired reactor temperature profile. Referring to FIG. 5, the actuators can adjust the TC-f1 setpoint, C1, C2, and the like.

According to some embodiments, such MPC algorithm, unlike PID controllers, have predictive abilities to anticipate future events and take/provide control options/actions accordingly, as discussed herein and in more detail below. According to some embodiments, any type or variation of a MPC algorithm, whether known or to be known, can be implemented, such as, but not limited to, nonlinear model predictive control (NMPC), Explicit MPC (eMPC), Robust variants of MPC, including, but not limited to, Min-Max MPC, constraint tightening MPC, Tube MPC, Multi-stage MPC, and the like, and any type or form of a commercially available MPC package, and the like, or some combination thereof.

In some embodiments, the temperature profile target can be defined for each reactor control problem. In some embodiments, the profile can consist of bed effluent temperatures. In some embodiments, the profile can consist of a combination of bed temperatures, bed inlet temperatures, and bed effluent temperatures weighted by the volume of catalyst in each bed.

In some embodiments, space velocity can factor into the temperature profile. As just one non-limiting example, hydrocracker reactors in petrochemical plants can use a Weighted Average Bed Temperature ("WABT"), which can measure of reaction severity. In some embodiments, it can be function of measured reactor temperatures weighted by reactor geometry and catalyst volume.

Turning now to FIG. 6, a non-limiting model and control structure 600 are disclosed according to some embodiments of the present disclosure. In some embodiments, model bed 1 can predict the bed 1 effluent temperature (TI-e1 prediction) using all relevant measured inputs. In some embodiments, additional models can be embedded in the MPC Controller that can use the TI-e1 model error (first bed model error) in addition to all relevant measured inputs to predict and control the reactor temperature profile. In some embodiments, the output of the MPC Controller can adjust to the following: TC-f1 setpoint (or valve actuator); C1; C2; C3 (Q1, Q2), wherein Q values represent heat transfer into the system, and the like.

In some embodiments, TC-f1 can be controlled by an upstream furnace or heat exchanger. In some embodiments, C1 (for bed 1), C2 (for bed 2, not shown) and C3 (for bed 3, not shown) can be controlled by adjusting the flow of a cooler stream added to the effluent, a flow of cooling water or other cooling medium to a heat exchanger, or mechanical manipulation of a fin-fan cooler, or other devices for heat removal.

In some embodiments, as illustrated in FIG. 6, the temperature differential 602 across the first bed can be developed and an error (TI-e1 model error) from the prediction temperature differential compared to the actual temperature differential can be used to infer unmeasured feed composition disturbances. In some embodiments, the inferred feed composition changes can be used in the control of the downstream fixed beds for faster response to unmeasured feed composition changes. In some embodiments, this can result in better control of the temperature profile throughout a reactor.

In some embodiments, the first bed model error (TI-e1 model error) can be used as an input into an overall model that predicts reactor temperature profiles. In some embodiments, the first bed model error can provide advanced notice to the downstream bed models via a feed forward signal. In some embodiments, the temperature control for reactions in downstream beds can be adjusted to compensate more quickly to a feed composition change.

In some embodiments, a MPC algorithm can be applied, as discussed herein. In some embodiments, MPC can be applied to adjust the bed intercooling and the first bed feed temperature so that the reactor temperature profile can be more precisely controlled.

In some embodiments, the temperature profile of a reactor with a series of fixed beds can often be a major factor in determining reaction kinetics and chemical equilibrium. In some embodiments, the profile can affect the reactor product composition. In some embodiments, this can be the primary objective of reactor operation and control.

Turning now to FIG. 7, Process 700 details a non-limiting embodiment according to some embodiments of the instant disclosure for improving temperature profile control in a reactor with at least three fixed beds, exothermic reactions and interstage cooling. The steps of Process 700 will be discussed with reference to the embodiments of FIGS. 5 and 6, as discussed above (e.g., reactor with three fixed beds); however, it should be construed as limiting, as one of skill in the art would understand that the mechanisms and methodologies of Process 700 can be applied to a reactor with any number of beds and/or designs/configurations without departing from the scope of the instant disclosure.

According to some embodiments of Process 700, Steps 702-704 are performed by temperature module 402 of control engine 400; Step 706 is performed by error module 404; Steps 708-710 are performed by feed composition disturbance module 406; and, Steps 712-718 are performed by profile module 408.

Process 700 begins with Step 702 where values (e.g., temperature values) of a first fixed bed within a reactor with a series of fixed beds are identified. The first fixed bed being the bed that receives R, the total feed stream, as discussed above. As discussed above, the values can be across the bed, at various components situated within the bed, around the bed, such as, but not limited to, the inlet, outlet and interior from which bed temperatures can be measured and obtained. For example, the values can correspond to the feed inlet temperature (TC-f1), feed flow R, or individual components of R, and the like.

In Step 704, a model of a temperature differential across the first fixed bed is determined. Such determination is based on the values identified from Step 702 above. In some embodiments, the model of the temperature can be implemented using any known or to be known algorithm to compute the differential across the first fixed bed, such as, but not limited to, FIR, ARx, and neural nets, and the like, as discussed above.

In Step 706, a determination is made regarding an error for the first fixed bed (TI-e1 model error). The error is determined based on a comparison between the determined modeling of the temperature and an actual temperature differential, as discussed above. Thus, in some embodiments, Step 706 involves determining an actual temperature differential and comparing it to the determined modelling from Step 704.

As discussed above, the TI-e1 model error is related to the change in unmeasured feed composition Xf1. For example, if the error is trending positive it means that the feed composition Xf1 is changing so that there are more exothermic reactions in bed 1 than predicted. This change in reactor conditions leads to a change in the bed 1 effluent composition (Xe1) and will in turn affect bed 2 conditions and temperatures. After the fluid passes through bed 2 it will then cascade to disturb bed 3 and any other beds in the series. The specifics of the error determination are discussed above in detail in relation to FIGS. 5 and 6.

In Step 708, the error (from Step 706) is leveraged to infer (or determine) unmeasured feed composition disturbances, as discussed above. The inferred feed composition changes are used as a basis for the control of the downstream fixed beds (e.g., beds 2 and 3). Step 710. This enables a faster response to unmeasured feed composition changes, which results in better control of the temperature profile throughout the reactor.

Turning back to Step 706, additionally, upon determining the TI-e1 model error, an MPC algorithm is applied. As discussed above, application or execution of the MPC with at least the TI-e1 model error as an input enables adjustment of bed cooling (Step 714) and adjustment of a first bed feed temperature(s) (Step 716). That is, in some embodiments, the first bed model error is leveraged, via the MPC, to predict reactor temperature profiles. Use of the first bed model error provides advanced notice (a feed forward signal) to the downstream bed models so that the temperature control for reactions in downstream beds will be adjusted to compensate more quickly to a feed composition change. The MPC, therefore, is applied to adjust the bed intercooling (Step 714) and bed 1 feed temperature (Step 716) so that the reactor temperature profile can be more precisely controlled. Step 718. This control enables the reactors (e.g., reactor 500) to employ model 600 to control its temperature profile so that error inputs, either at the source at bed 1 or via the intercooling between beds (e.g., bed 1 to bed 2, or bed 2 to bed 3) are identified, remedied and addressed in order to maintain a temperature profile for the reactor that ensures safe operation at an optimal level of operation.

Any of the operations described herein that form part of the disclosure are useful machine operations. The disclosure also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

Some embodiments can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the disclosure are set forth in the following claims.

What is claimed is:

1. A device comprising:
    a processor configured to:
        identify a set of values of a first fixed bed of a reactor with a series of fixed beds;
        determine, based on the identified values, a predicted temperature differential for the first fixed bed;
        determine an actual temperature differential for the first fixed bed;
        determine, based on the predicted temperature differential and the actual temperature differential, a model error for the first fixed bed;
        apply a model predictive control (MPC) algorithm to the determined model error; and
        automatically control, based on the application of the MPC, a temperature profile of the reactor, the temperature profile corresponding to each of the series of beds in the reactor, the temperature profile providing functionality for temperature control of reactions in each of the series of beds to compensate for feed composition changes.

2. The device of claim 1, wherein the processor is further configured to:
    adjust intercooling between each of the series of beds based on the application of the MPC, wherein said control is based on said intercooling adjustment.

3. The device of claim 1, wherein the processor is further configured to:
    adjust a feed temperature for the first fixed bed based on the application of the MPC, wherein said control is based on said feed temperature adjustment.

4. The device of claim 1, wherein the processor is further configured to:
    determine, based on the model error, a change in unmeasured feed composition.

5. The device of claim 4, wherein the processor is further configured to:
    control downstream beds based at least in part on the determined change in unmeasured feed composition, wherein the downstream beds comprise beds within the series of beds of the reactor other than the first fixed bed.

6. The device of claim 5, wherein the control of the downstream beds comprises responding to unmeasured feed composition changes in each of the downstream beds.

7. The device of claim 1, wherein the values correspond to temperature values across and within the first fixed bed.

8. The device of claim 7, wherein the temperature values correspond to an inlet, outlet and interior of the first fixed bed.

9. The device of claim 1, wherein the values correspond to a feed inlet temperature, feed flow and components of the feed flow.

10. The device of claim 1, wherein the first fixed bed is the bed of the reactor that receives a total feed stream as an initial input.

11. A method comprising:
identifying, by a processor, a set of values of a first fixed bed of a reactor with a series of fixed beds;
determining, by the processor, based on the identified values, a predicted temperature differential for the first fixed bed;
determining, by the processor, an actual temperature differential for the first fixed bed;
determining, by the processor, based on the predicted temperature differential and the actual temperature differential, a model error for the first fixed bed;
applying, by the processor, a model predictive control (MPC) algorithm to the determined model error; and
automatically controlling, by the processor, based on the application of the MPC, a temperature profile of the reactor, the temperature profile corresponding to each of the series of beds in the reactor, the temperature profile providing functionality for temperature control of reactions in each of the series of beds to compensate for feed composition changes.

12. The method of claim 11, further comprising:
adjusting intercooling between each of the series of beds based on the application of the MPC, wherein said control is based on said intercooling adjustment.

13. The method of claim 11, further comprising:
adjusting a feed temperature for the first fixed bed based on the application of the MPC, wherein said control is based on said feed temperature adjustment.

14. The method of claim 11, further comprising:
determining, based on the model error, a change in unmeasured feed composition; and
controlling downstream beds based at least in part on the determined change in unmeasured feed composition, wherein the downstream beds comprise beds within the series of beds of the reactor other than the first fixed bed.

15. The method of claim 14, wherein the control of the downstream beds comprises responding to unmeasured feed composition changes in each of the downstream beds.

16. The method of claim 11, wherein the values correspond to temperature values across and within the first fixed bed, wherein the temperature values correspond to an inlet, outlet and interior of the first fixed bed.

17. The method of claim 11, wherein the values correspond to a feed inlet temperature, feed flow and components of the feed flow.

18. A non-transitory computer-readable storage medium tangibly encoded with computer-executable instructions, that when executed by a processor associated with a computing device, performs a method comprising:
identifying, by the processor, a set of values of a first fixed bed of a reactor with a series of fixed beds;
determining, by the processor, based on the identified values, a predicted temperature differential for the first fixed bed;
determining, by the processor, an actual temperature differential for the first fixed bed;
determining, by the processor, based on the predicted temperature differential and the actual temperature differential, a model error for the first fixed bed;
applying, by the processor, a model predictive control (MPC) algorithm to the determined model error; and
automatically controlling, by the processor, based on the application of the MPC, a temperature profile of the reactor, the temperature profile corresponding to each of the series of beds in the reactor, the temperature profile providing functionality for temperature control of reactions in each of the series of beds to compensate for feed composition changes.

19. The non-transitory computer-readable storage medium of claim 18, further comprising:
adjusting intercooling between each of the series of beds based on the application of the MPC; and
adjusting a feed temperature for the first fixed bed based on the application of the MPC, wherein said control is based on the intercooling adjustment and the feed temperature adjustment.

20. The non-transitory computer-readable storage medium of claim 18, further comprising:
determining, based on the model error, a change in unmeasured feed composition; and
controlling downstream beds based at least in part on the determined change in unmeasured feed composition, wherein the downstream beds comprise beds within the series of beds of the reactor other than the first fixed bed, wherein the control of the downstream beds comprises responding to unmeasured feed composition changes in each of the downstream beds.

* * * * *